United States Patent
Ding

(10) Patent No.: US 8,542,646 B1
(45) Date of Patent: Sep. 24, 2013

(54) INTERFERENCE MITIGATION FOR NETWORK COMMUNICATIONS

(75) Inventor: Gang Ding, San Diego, CA (US)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/153,242

(22) Filed: Jun. 3, 2011

(51) Int. Cl.
  *H04W 4/00* (2009.01)
  *A61N 1/00* (2006.01)
  *G08C 15/06* (2006.01)

(52) U.S. Cl.
  USPC .................. 370/329; 607/60; 340/870.04

(58) Field of Classification Search
  USPC .............. 379/106.02, 106.03, 100.09, 133, 379/136; 370/419, 420, 329, 241; 607/60, 607/32; 340/870.04, 870.07
  See application file for complete search history.

(56) References Cited

U.S. PATENT DOCUMENTS 7,162,307 B2    1/2007  Patrias
7,623,922 B2 *  11/2009 Bange et al. .................... 607/32
2007/0299349 A1  12/2007 Alt et al.
2009/0312821 A1 * 12/2009 Doerr ............................ 607/60
2011/0285545 A1 * 11/2011 Scordilis .................. 340/870.04

OTHER PUBLICATIONS

Code of Federal Regulations, Title 47, vol. 5, Part 95—Personal Radio Services, Federal Communications Commission, pp. 527-566 (2009).
Arthur Astrin and TG6 Team, Wireless Personal Area Networks, Apr. 18, 2010, IEEE P602.15, pp. 1-222 (May 2010).

\* cited by examiner

*Primary Examiner* — Hanh N Nguyen
(74) *Attorney, Agent, or Firm* — Sheppard Mullin Richter & Hampton LLP

(57) ABSTRACT

In a network having a plurality of network devices communicating across the network, a method, includes performing a first scan of a first plurality of channels of the network, wherein the channels are scanned for a first scan time; identifying a list of one or more potentially available channels based on results of the first scan; performing a second scan of the network channels, the second scan scanning only those channels identified as potentially available channels based on the first scan, one of the each potentially available channel for a second scan time and wherein the second scan time is longer than the first scan time; and identifying an available channel based on results of the second scan and selecting the available channel for communication.

16 Claims, 5 Drawing Sheets

INTERFERENCE MITIGATION FOR NETWORK COMMUNICATIONS

FIELD OF THE INVENTION

The present invention relates generally to systems and methods for wireless communication and more particularly, some embodiments relate to interference mitigation for wireless communication systems.

DESCRIPTION OF THE RELATED ART

With the many continued advancements in communications technology, more and more devices are being introduced in both the consumer and commercial sectors with advanced communications capabilities. Additionally, advances in processing power and low-power consumption technologies, as well as advances in data coding techniques have led to the proliferation of wired and wireless communications capabilities on a more widespread basis.

For example, communication networks, both wired and wireless, are now commonplace in many home and office environments. Such networks allow various heretofore independent devices to share data and other information to enhance productivity or simply to improve their convenience to the user. Exemplary networks include the Bluetooth® communications network and various IEEE standards-based networks such as 802.11 and 802.16 communications networks, to name a few.

Medical device makers, recognizing benefits of wireless technology, sought to include wireless communication capability with implantable medical devices. Previous generation communication protocols for implantable devices relied on inductive communications to transfer information to and from the implanted device. Advances in low power wireless communications enabled communications without reliance on the close proximities required for communication via inductive links. Accordingly, contemporary devices include a wireless transceiver at the device that communicates with a local wireless relay point or access point. The local wireless relay point can be configured to log data from the implantable device and transfer that data to a base station, such as at a health care provider facility, personal computing device or other base station. The relay point can, for example, be incorporated into a bracelet or other 'wearable' external device. Accordingly, the relay point can be provided with data storage devices, a user interface, and various communication links for communications to the base station.

In 1999 the Federal Communication Commission (FCC) standardized the communication protocols for medical device implants. The Medical Device Radiocommunications Service (MedRadio) is an ultra-low power, unlicensed, mobile radio service for transmitting data in support of diagnostic or therapeutic functions associated with implanted and body-worn medical devices. The Medical Implant Communication Service (MICS) is a specification that governs such wireless communications with medical implants.

MedRadio permits individuals and medical practitioners to utilize ultra-low power medical implant devices, such as cardiac pacemakers and glucose monitoring devices, without causing interference to other users of the electromagnetic radio spectrum. Devices operating according to the MICS specification operate in the frequency band between 402 and 405 MHz. The low power allowed by the specification, e.g., on the order of 25 microwatts effective isotropic radiated power (EIRP), ensures a low risk of interference with other users in the band, but still yielding a range of a couple of meters. MICS is a low bit rate system relative to other networks, permitting a maximum bit rate of 300 kHz.

No licensing is required for the MedRadio service, but MedRadio equipment must only be operated by a duly authorized health care professional. Operations rules and technical regulations applicable to MedRadio transmitters are found within 47 CFR 95.601-95.673 Subpart E and 47 CFR 95.1201-95.1221 Subpart I. See a summary of MedRadio operations rules, or read more about equipment issues or radiation testing.

MedRadio transmitters must be evaluated by manufacturers to ensure that their use will not result in the exposure of either patients or medical professionals to radiofrequency (RF) radiation emissions that are considered unsafe. Manufacturers are required to file with the FCC, among other things, a certification of compliance with the RF exposure rules in order to secure FCC approval to market their equipment.

MAC protocols are specified for MedRadio transmitters to enable channel selection in a manner that reduces interference and utilizes available channels. As part of this protocol, external medical implant programmer/control MedRadio transmitters operating in the 402-405 MHz band must incorporate a mechanism for monitoring the channel or channels that the MedRadio system devices intend to occupy and, unless there is a medical implant event, may not initiate a MedRadio communications session unless certain "access criteria" are met. (See 47 CFR 95.628(a)). A medical implant event is defined as an occurrence or the lack of an occurrence recognized by a medical implant device, or a duly authorized health care professional, that requires the transmission of data from a medical implant transmitter in order to protect the safety or well-being of the person in whom the medical implant transmitter has been implanted. (47 CFR 95 Appendix 1).

Because there are at least 10 channels in this frequency band, the protocols require that each external device, or relay device, find a clean channel in order to avoid interference with other devices. However, the current protocol leaves two technical holes: (1) When a device finds a channel that it believes is clean and starts using it, this channel may actually still being used by another device, which causes interference between them; and (2) When a device is already using a channel for data transmission, there might be gaps between its data transmissions, during which other devices may consider this channel to be clean and start using it, which will also cause interference.

The FCC regulation specifies following rules to scan and find a clean channel:

Within idleTime before data transmission in a channel, the device must scan this channel.

Each channel must be scanned for scanTime.

During data transmission, when the 'silence period between two data transmission is longer than idleTime, the channel must be re-scanned in order to make sure it is clean.

The value for idleTime is 5 seconds, and the value for scanTime is 10 milliseconds.

The latest IEEE 802.15.6 body area network standard specifies both MAC and PHY standards for the above MedRadio frequency band. But it does not provide any solution to the interference avoidance problem.

BRIEF SUMMARY OF THE INVENTION

Various embodiments of the systems and methods described herein may be used to perform channel selection for network devices. According to some embodiments of the invention, a two-stage scanning process may be performed for channel selection. In a first stage of the two-stage scanning process, a network device scans designated network channels to determine whether one or more of these channels is available for communication. In some embodiments, every network channel is scanned during this first-stage scanning cycle. In other embodiments, only a predetermined subset of less than all the network channels is scanned.

In some embodiments, the scan time utilized for this first-stage scanning is a relatively short period of time to allow scanning of a large number of channels in a brief time frame. In some embodiments, the scan time used for this first-stage scanning can be 10 ms. In other embodiments, other scan times can be selected. Preferably, in some embodiments, the scanning time of each channel is selected such that all channels to be scanned can be scanned within a maximum idle time allotted for network devices. In various embodiments, the first stage scanning is performed in accordance with the protocols set out for channel scanning and selection in the MICS network communication protocol.

As a result of the first-stage scanning operation, available network channels are identified. Available network channels are those channels for which no communication activity was detected by the scanning device during the scan of each respective channel.

During second-stage scanning, the network device scans the network channels to determine an available channel for communication. In various embodiments, the channels scanned are scanned for a longer period of time than they were for stage-one scanning. In various embodiments, not all of the network channels are scanned during the second stage scanning. In some embodiments, only those channels that were identified as available by the first-stage scanning operation are scanned in the second stage. In this manner, the process does not need to perform second-stage scanning on channels that were already identified as being occupied by other network devices.

In some embodiments, the scanning time for channels scanned in the second stage is equal to or greater than the maximum idle time specified or allowed for network devices. In this manner, if a channel is being used by other devices but those devices are idle for the maximum idle time, their usage of the channel may still be detected. Accordingly, scanning for a longer period of time at the second stage increases the chances that channel occupancy will be detected, especially in circumstances where sporadic or bursty communications are present on a given channel. Performing this longer-scan-time scanning on only those channels identified as potentially available by the first-stage scanning process can conserve resources by not requiring longer scan times on every channel.

As a result of the second-stage scanning, one or more channels can be identified as being occupied and available for communication. The process then selects one of these channels for communication. In some embodiments, the first channel identified by the device as available as a result of the second-stage scanning is channel selected and no further scanning is required. In various embodiments, the scan order can be predetermined, fixed, or random. For example, the skin or maybe selected as scanning each channel from 1-n until an available channel is identified. As another example, channels in particular parts of the spectrum or channels of desired bandwidths can be selectively scanned or given a higher priority in the scan order to meet operational performance criteria associated with a particular network device.

In some embodiments, busy signaling can be used to facilitate identification of occupied channels for scan operations that use relatively small scan times. Busy signaling can be used for single stage for dual stage scanning to increase the likelihood that occupied channel is detected.

For example, control packets, or busy packets, can be sent by a network device occupying a channel in between bursts of operational communication between that network device and one or more other network devices on the channel. Accordingly, if the network devices occupying a channel happen to be idle for your time they can send control packets, or busy packets, across the network for the purpose of announcing to other devices that may be scanning for channel selection that the channel is occupied. In the case of first-stage scanning (whether or not a second stage scan is also performed) embodiments can be provided such that the busy packets can be sent frequently enough such that they are bound to fall within the scan time used for each channel. In other words, the duty cycle and periodicity of the control packets can be selected such that the packet will be present during a minimum scanning time employed by a another device performing channel selection.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
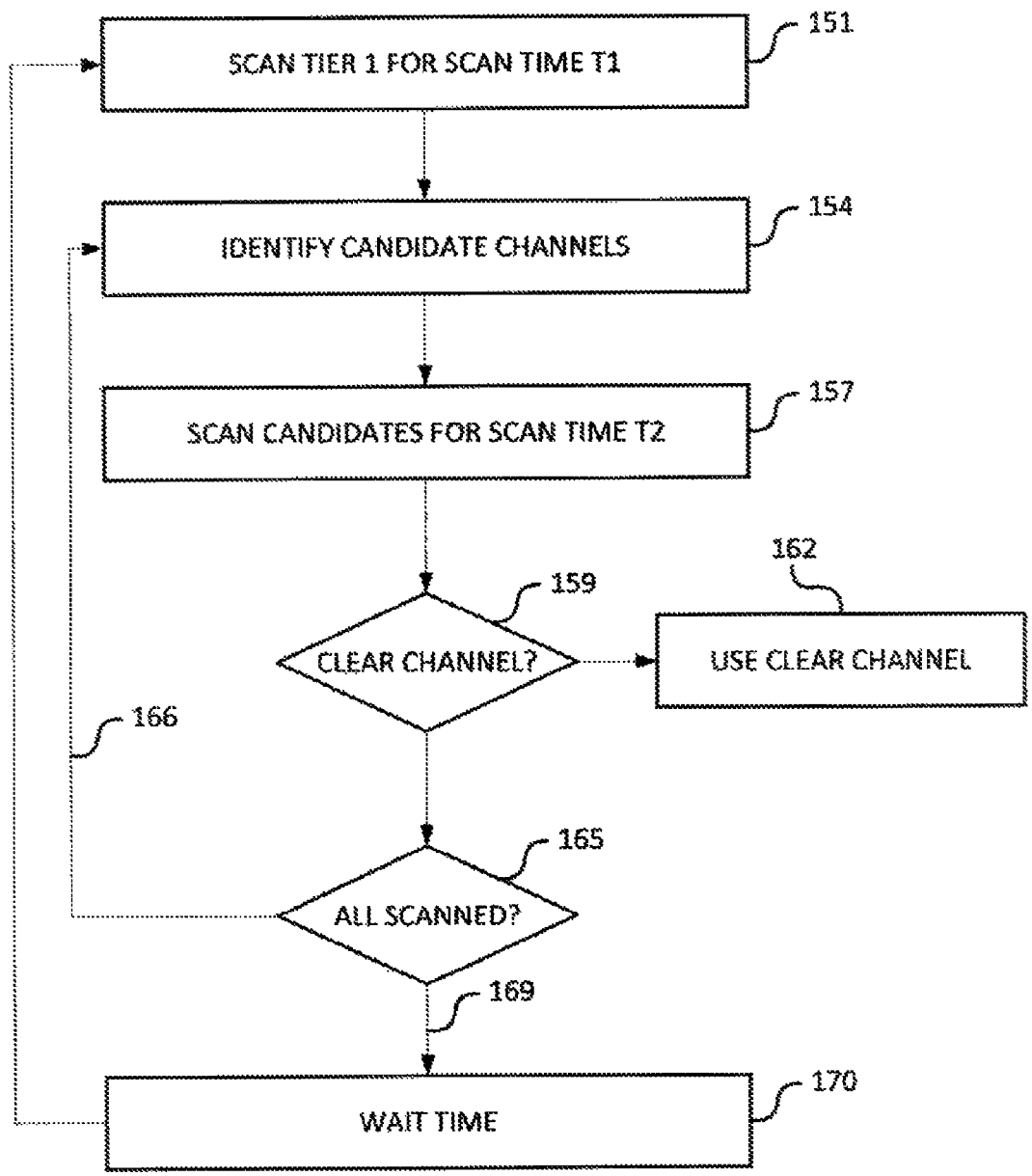
FIG. 1 is a flowchart illustrating an example process for channel selection in accordance with one embodiment of the systems and methods described herein.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE
EMBODIMENTS OF THE INVENTION

In various embodiments, systems and methods may be implemented to allow one or more network devices to perform a channel selection process for communication with one or more other network devices. For ease of description, the present invention is described in terms of an example environment of a personal area network used in conjunction with implantable medical devices. One possible example of such a personal area network includes an implantable or wearable medical device such as a defibrillator, glucose monitor, or other medical control, delivery or monitoring device. Such a device may be implanted into a patient or worn by the patient to perform functions such as, for example, monitoring the patient's medical condition, delivering medicaments to the patient, and sending signals to affect the patient's condition.

The example personal area network can also include a relay device that can be worn by or carried by the patient. One example of a relay device is a bracelet worn by the patient to relay information to/from the medical device. The relay device typically includes a communication capability to communicate wirelessly to the medical device. Accordingly, patient or treatment information or other telemetry or information from the medical device can be sent to the relay device. Likewise, treatment instructions, commands or other information can be sent from the relay device to the medical device. In some embodiments, the relay device can include a user interface to enable communication of information to the patient or the patient's caregiver. The user interface can include, for example, a display screen or other audio or video interface to provide information to a user.

The relay device can also include a communication capability to relay information from or to an external device. For example, the relay device can include a wireless transceiver to provide communications with a monitoring device or care facility such as a doctor's office or other health care facility. The monitoring device could also include, for example, the patient's home computer. Accordingly, information from the medical device can be sent to the monitoring device to allow patient information, drug delivery information, and other like information to be received at, logged at and viewed by the health care facility and health care providers. Likewise, updates or instructions from the health care facility can be sent to the medical device via the relay device.

As noted in the background section, it is common for relay devices and medical devices to communicate according to the MICS protocol. With protocols such as MICS and environments such as the PAN, it is possible that channel selection can lead to interference. Accordingly, exemplary solutions to reduce or minimize interference caused by channel selection are described herein. Although these solutions are described in terms of the example environment of a PAN operating using the MICS protocol, one of ordinary skill in the art will understand that the solutions described herein can be used in a number of different environments and settings.

In some embodiments, in order to select a clear channel, the network device performs a two-stage channel scanning process. In the first stage, the process scans all channels for a minimum scan time, T1, to see which of the network channels appear unused. In the second stage, the process scans the channels that appear unused in scan 1, but this second stage scan is for a longer scan time. In some embodiments, this second scan time is set to be for at least the maximum idle time allowed for devices on the channel. Scanning for this length of time allows the devices to ensure that no other device is currently occupying the channel.

FIG. 1 is a diagram illustrating an example process for channel selection in accordance with one embodiment of the systems and methods described herein. Referring now to FIG. 1, in a step 151, the network device performs a first scan of all channels. In this example, the network device performs the first channel scan for the first scan time, T1. In some embodiments, this first scan time, T1, is a minimum scan time determined to allow the devices to scan through the channels rapidly to determine whether other devices are communicating on those channels.

In some embodiments, the first stage scanning can be performed as the channel scanning is conventionally performed according to the MICS protocol. For example, in some embodiments in terms of the MICS protocol, the first scan is a 1-tier scan and the channel scan time in the first stage is the same time as the channel scan time, scanTime, specified by the MICS protocol. Further to this example, the scan time T1 may be specified as 10 milliseconds, and the channel scanning is performed in the amount specified for idleTime, or 5 seconds. As would be apparent to one of ordinary skill in the art other times and durations can be specified.

In a step 154, the network device identifies candidate channels based on the first stage scan. In other words, channels for which no other traffic was detected during the first scan time are identified as possible candidates for selection. Channels on which traffic was detected during the first stage scan are not considered as candidates for selection at this time.

In a step 157, the network device scans the identified channel candidates to determine which of those, if any, may be suitable channels for selection. In this example, the identified channel candidates are scanned for a scan time, T2, which is preferably longer than scan time T1. In some embodiments, the scan time T2 is set to be at least as long as the maximum idle time allowed for devices on the network. In this manner, if a device pair is communicating using a given channel, the communication will be detected, provided the device pair honors the maximum idle time requirements. In terms of the MICS protocol example, the scan time T2 is set at least as long as idleTime, or five seconds. As would be apparent to one of ordinary skill in the art, other times and durations can be specified.

In step 159, if a clear channel is detected as a result of the second stage scan, the device selects that channel and, in step 162, commences network communication on that channel. In some embodiments, the device selects the first channel it detects as free for time T2 and ceases scanning the other channels. In other embodiments, additional channels can be scanned and the selection process made using a channel other than the first free channel detected.

If in step 159 the channel scanned is not clear, the process continues to scan the next identified channel candidate to see if it is clear for time T2. This process continues for all identified candidate channels until a clear channel is detected. This is illustrated by operation 165 and flow line 166.

If all the ideal candidate channels are scanned for time T2 and none of them is identified as free, the process begins again as illustrated by flow line 169. In some embodiments, before beginning the process again, the process waits 170 for a predetermined wait time to allow current communication activity to abate.

Figure 2:
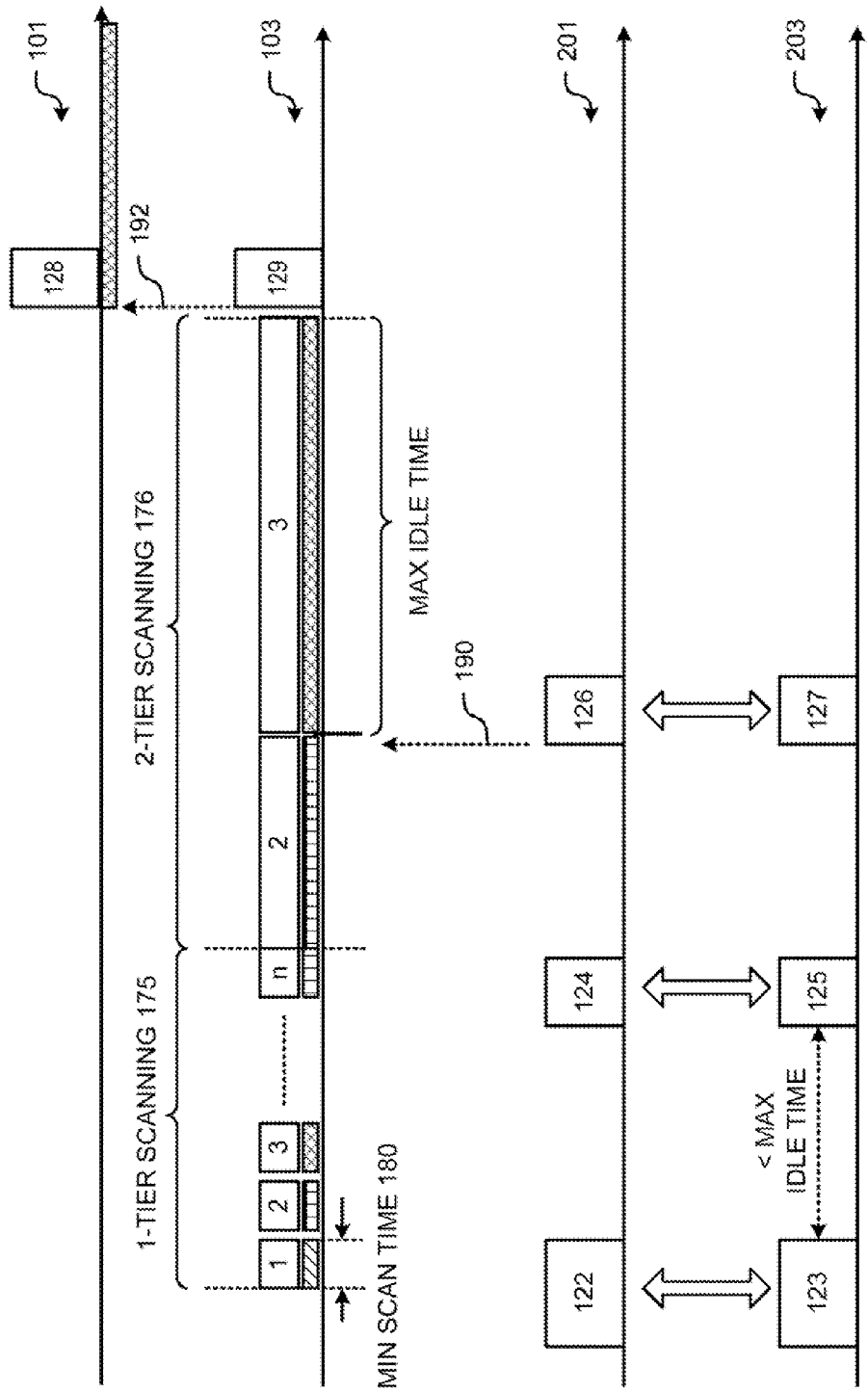
FIG. 2 is a diagram illustrating an example scenario for network channel selection in accordance with various embodiments of the systems and methods described herein.

FIG. 2 is a diagram illustrating an example scenario for network channel selection in accordance with various embodiments of the systems and methods described herein. Referring now to FIG. 2, consider an example where a first device pair, medical device 101 and relay device 103 are getting ready to communicate on a personal area network. In the illustrated example scenario, a mother device pair, medical device 201 and relay device 203 are communicating on channel 2 as illustrated by communication blocks 122, 123, 124, 125, 126, 127. Consider further example where these devices operate in accordance with the example system and method described above with reference to FIG. 1. In this example, network device 103 performs a two-stage channel scan as illustrated by one-tier scanning 175 and two-tier scanning 176.

In the example illustrated in FIG. 2, there are up to n possible channels upon which the devices may communicate. In the one-tier scanning 175, device 103 scans each channel 1-n for a ScanTime T1. In the illustrated example, ScanTime T1 is shown as MIN SCAN TIME 180. In accordance with the process described above with respect to FIG. 1, device 103 determines which channels are free based on one-tier scanning 175. These are the channels for which no traffic is detected during the ScanTime T1. These free channels are identified as candidate channels for channel selection.

As seen in the illustrated example, and assuming channel 1 is busy, device 103 determines the channels 2-n have no traffic during their respective scans and are therefore identified as candidate channels. As also illustrated in FIG. 2, during the one-tier scanning interval 175, devices 201, 203 are conducting a communication on channel 2 illustrated by communication blocks 122, 123. However, because this communication 122, 123 did not occur during the scan time for channel 2, device 103 did not detect this communication during its 1-tier scanning operation 175. Accordingly, channel 2 was identified as a candidate channel by device 103 and channel 2 will be scanned by device 103 during the second stage scan.

In as part of the two-tier scanning process 176, device 103 scans the identified candidate channels 2-10. However, at this stage, each channel scanned for at least the maximum idle time for network communications. Although communications between devices to a one and two of three are somewhat sporadic, they still occur within the maximum idle time. Accordingly, the scanning of channel 2 by device 103 for at least the maximum idle time detects the sporadic communications on channel 2 between devices 201, 203.

As a result, at time 190, when the communication between devices 202, 203 are detected device 103 ceases scanning channel two and begins scanning channel 3. Because channel 3 is clear for the maximum idle time, device 103 selects channel 3 for communications with device 101; and at time 192, devices 101, 103 begin communications using channel 3. Communications are illustrated by blocks 128, 129.

Figure 3:
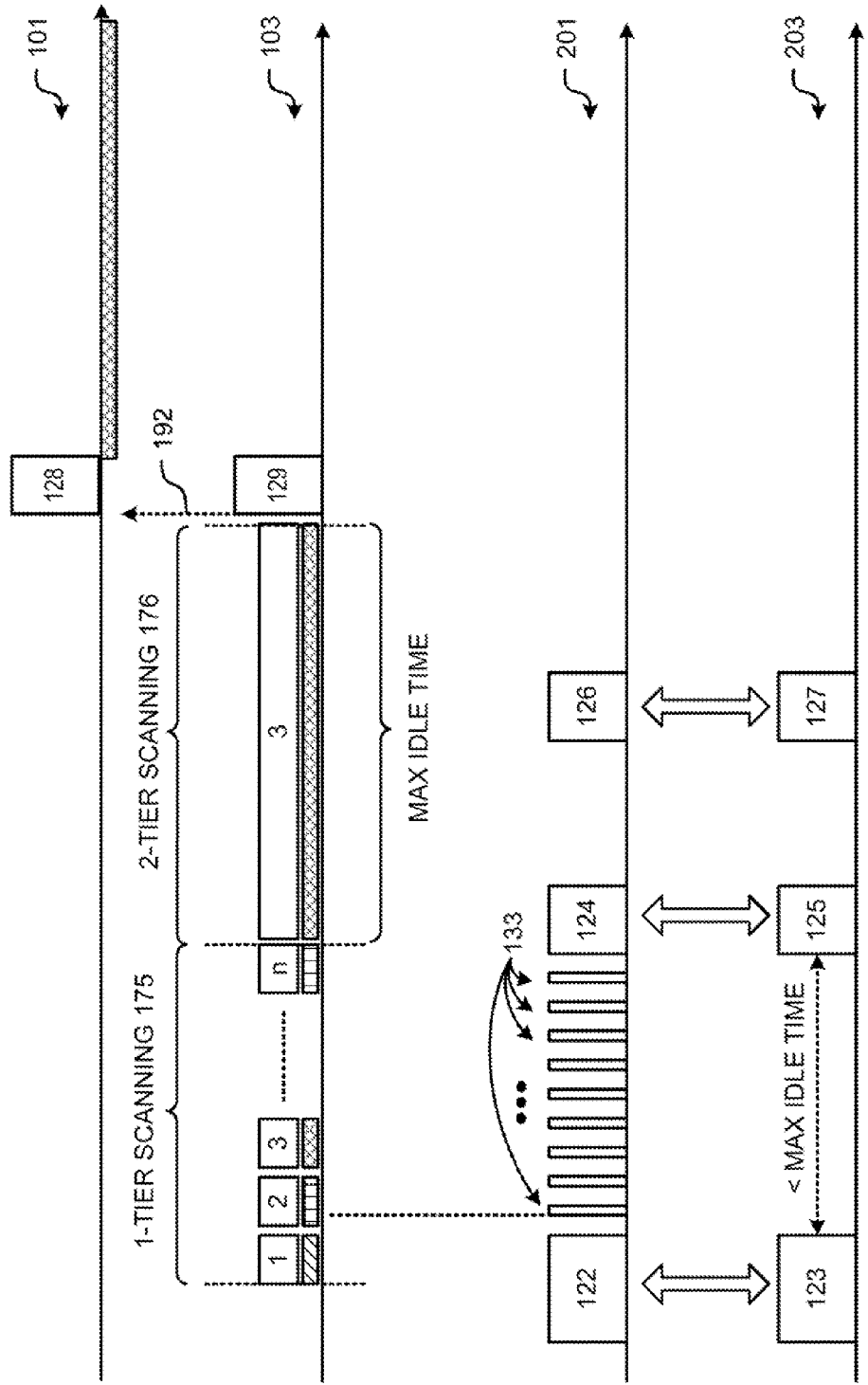
FIG. 3 is a diagram illustrating an example technique for safeguarding against interference in accordance with an example embodiment of the systems and methods described herein.

While a two-stage scanning process may reduce or even eliminate the chances for interference among devices, additional or alternative safeguards can be employed. FIG. 3 is a diagram illustrating an example technique for safeguarding against interference in accordance with an example embodiment of the systems and methods described herein. As illustrated in FIG. 3, device 201 sends additional bursts of communication 133 across channel 2 between its otherwise sporadic communications 122, 124. In this example embodiment, these control or guard packets 133 act as a busy signal and can be used to inform other devices that the channel is occupied. This can help to ensure that other devices performing one-tier scanning 175 detect the occupancy of channel 2 by device 201 so that the other devices (for example device 103 in the illustrated scenario) do not identify channel 2 as an open channel during 1-tier scanning 175. Preferably, control packets 133 are sent at a periodic interval that is shorter than the minimum scan time for 1-tier scanning 175. In this manner the busy signal can ensure, or increase the likelihood, that other devices performing 1-tier scanning 175 can detect the channel occupancy. In various embodiments, the duty cycle can be chosen such that the duration of 'on' time of the control packets 133 is small relative to their 'off' time to conserve system power.

In addition, in various embodiments, the control packets 133 are sent by the relay device rather than the implanted device, to conserve battery power with the implanted device, although this can be reversed. In other embodiments or in other operational environments, the transmission of control packets 133 can be shared among devices. Generally speaking, it is preferred that the control packets 133 be sent by the device having fewer constraints on available power.

This method of using control packets or other periodic transmissions as busy signals between actual communications can be employed in conjunction with the two-stage scanning process such as that described above with respect to FIG. 1. Alternatively, this method of using control packets or other periodic communications can also be used in a single stage scanning operation to help reduce or eliminate the risk of interference on a selected channel.

Figure 4:
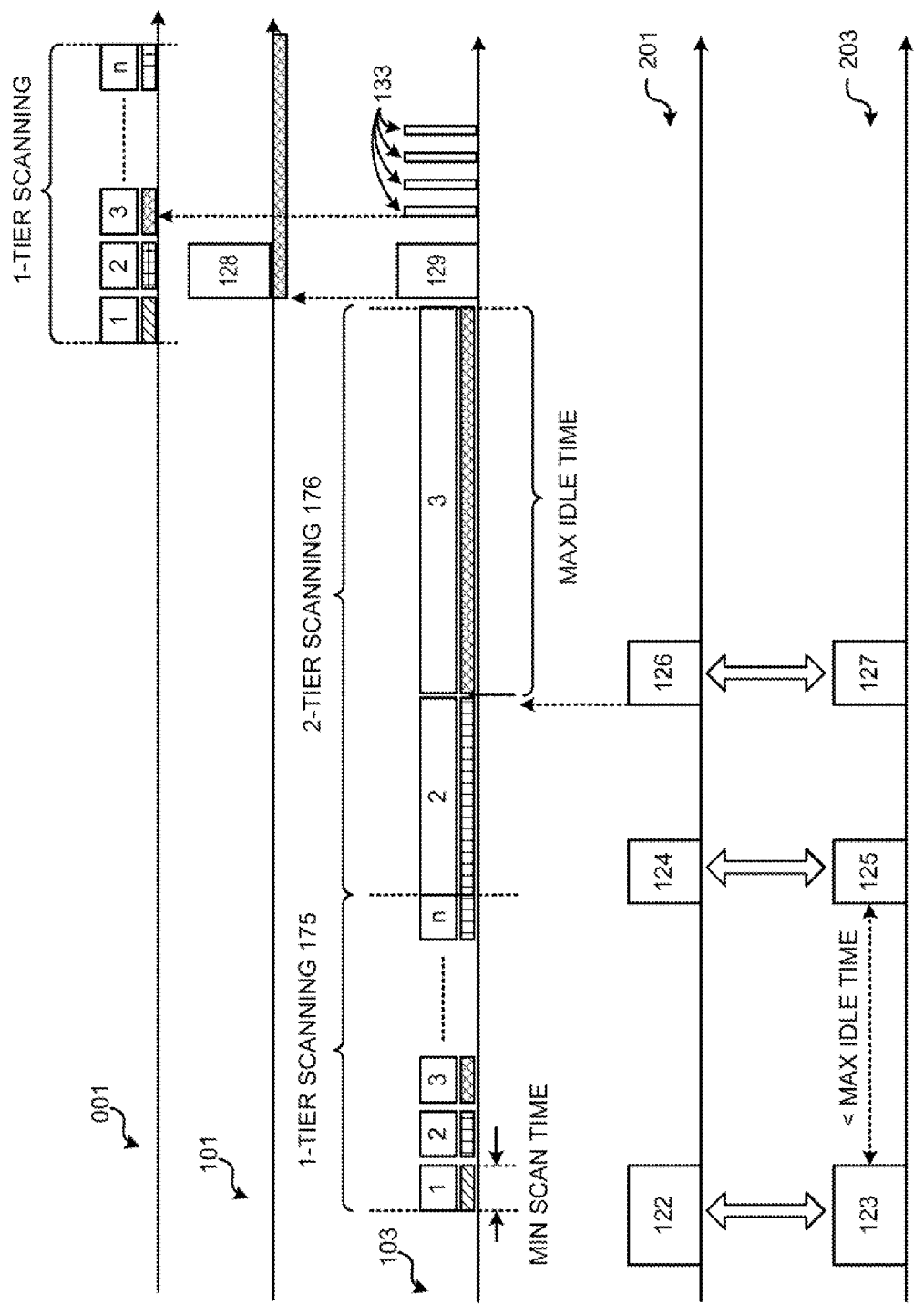
FIG. 4 is a diagram illustrating an example scenario using both 2-stage scanning and busy signaling in accordance with various embodiments of the systems and methods described herein.

FIG. 4 is a diagram illustrating an example scenario using both 2-stage scanning and busy signaling in accordance with various embodiments of the systems and methods described herein. Referring now to FIG. 3, in this example, Devices 101 and 103 are communicating on channel three as of time 192. As illustrated, channel 3 was selected using the two stage scanning process in an operational scenario similar to that described above with respect to FIGS. 1 and 2. However, in the example illustrated in FIG. 4, device 103 also uses the busy signal technique of FIG. 3, in which device 103 sends one or more control packets indicating that device 101 or devices 101, 103 are currently occupying channel 3. As noted above, the interval between packets 133 is preferably less than the minimum scan time selected for 1-tier scanning to ensure (or at least increase the likelihood) that another device doing 1-tier scanning detects the busy packet 133 and recognizes that the channel is currently occupied.

In terms of the example illustrated in FIG. 4, this figure shows a scenario in which devices 101, 103 are currently communicating on channel three, and device 103 is sending busy packets 133 during the idle times. Further in this example scenario, device 001 is engaged in a 1-tier scan cycle 175 during a portion of the time that devices 101, 103 are communicating on channel three. As this example illustrates, when device 001 performs its 1-tier scanning of channel three, it detects the transmission of the control packet 133 by device 103. In response, device 001 recognizes channel three to be occupied, and does not include channel three in its list of identified candidate channels. Therefore, device 001 does not need to scan channel three during 2-tier scanning 176. This can lead to decreased channel selection and acquisition as well as power savings.

Figure 5:
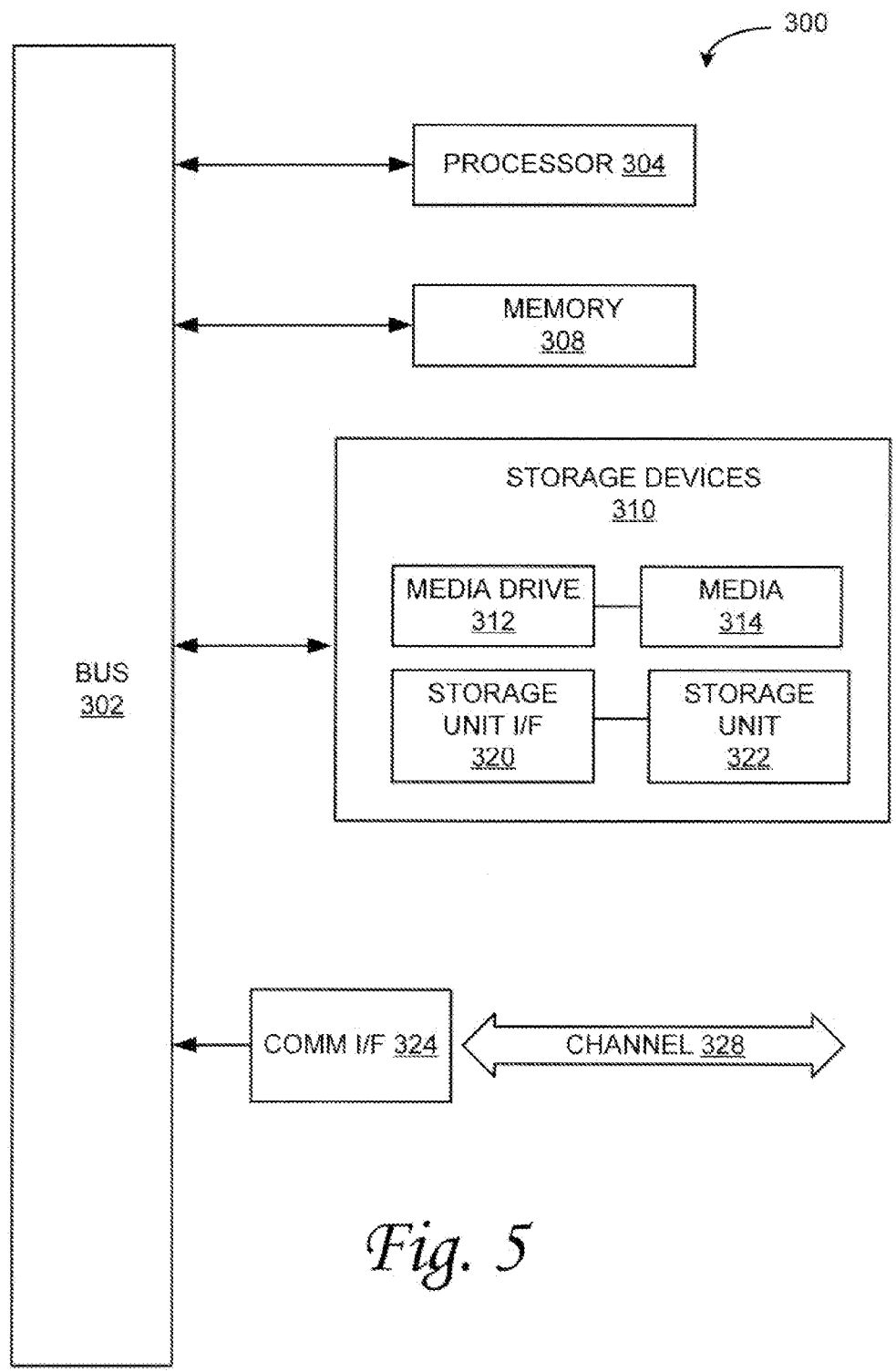
FIG. 5 is a diagram illustrating an example computing module with which embodiments of the systems and methods described herein may be implemented.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. In addition, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Where components or modules of the invention are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 300. After reading this description, it will become apparent to a person skilled in the relevant art how to implement the invention using other computing modules or architectures.

Referring now to FIG. 5, computing module 300 may represent, for example, computing or processing capabilities found within desktop, laptop and notebook computers; handheld computing devices (PDA's, smart phones, cell phones, palmtops, etc.); mainframes, supercomputers, workstations or servers, network devices; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals, medical devices, relay devices, and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD or DVD drive (R or RW), or other removable or fixed media drive might be provided. Accordingly, storage media 314 might include, for example, a hard disk, a floppy disk, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present invention as discussed herein.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

What is claimed is:

1. In a network having a plurality of network devices communicating across the network, a method, comprising:
   performing a first scan of a first plurality of channels of the network, wherein the channels are scanned for a first scan time;
   identifying a list of one or more potentially available channels based on results of the first scan;
   performing a second scan of the network channels, the second scan scanning only those channels identified in the list, wherein the channels identified in the list are scanned for a second scan time and wherein the second scan time is longer than the first scan time; and
   identifying an available channel based on results of the second scan and selecting the available channel for communication;
   wherein the first scan time is short enough to enable scanning of every channel of the network before the expiration of a maximum idle time allowed for network devices communicating on the network.

2. The method of claim 1, wherein identifying a list of one or more potentially available channels comprises checking a scanned channel for communication activity during the scanned channel's respective scan time and if no communication, activity is detected during that scan time, categorizing the scanned channel as potentially available.

3. The method of claim 1, further comprising initiating communication with another network device on the channel identified as available based on results of the second scan.

4. The method of claim 1, wherein performing a first scan of a first plurality of channels of the network, is performed in accordance with MICS protocols.

5. The method of claim 1, wherein the second scan time is equal to or greater than a maximum idle time allowed for network devices communicating on the network.

6. The method of claim 1, further comprising a device communicating on a channel of the network transmitting busy packets on that channel at predetermined time intervals in between operational network communications for that device.

7. The method of claim 6, wherein the busy packets are transmitted periodically, and the periodicity is selected such that at least one busy packet will be transmitted by a network device on the channel at a time when another network device performing channel selection is scanning that channel.

8. The method of claim 1, wherein, performing the second scan comprises scanning the one or more potentially available channels one at a time until an available channel is located.

9. A network device, comprising:
   a processor,
   memory coupled to the processor and configured to store program instructions executable by the processor, the program instructions comprising program code configured to perform the operations of:
   performing a first scan of a first plurality of channels of the network, wherein the channels are scanned for a first scan time;
   identifying a list of one or more potentially available channels based on results of the first scan;
   performing a second scan of the network channels, the second scan scanning only those channels identified in the list, wherein the channels identified in the list are scanned for a second scan time and wherein the second scan time is longer than the first scan time; and
   identifying an available channel based on results of the second scan and selecting the available channel for communication;
   wherein the first scan time is short enough to enable scanning of every channel of the network before the expiration of a maximum idle time allowed for network devices communicating on the network.

10. The network device of claim 9, wherein identifying a list of one or more potentially available channels comprises checking a scanned channel for communication activity during the scanned channel's respective scan time and if no communication, activity is detected during that scan time, categorizing the scanned channel as potentially available.

11. The network device of claim 9, wherein the operation further comprises initiating communication with another network device on the channel identified as available based on results of the second scan.

12. The network device of claim 9, wherein performing a first scan of a first plurality of channels of the network, is performed in accordance with MICS protocols.

13. The network device of claim 9, wherein the second scan time is equal to or greater than a maximum idle time allowed for network devices communicating on the network.

14. The network device of claim 9, wherein the operation further comprises communicating on a channel of the network transmitting busy packets on that channel at predetermined time intervals in between operational network communications for that device.

15. The network device of claim 14, wherein the busy packets are transmitted periodically, and the periodicity is selected such that at least one busy packet will be transmitted by a network device on the channel at a time when another network device performing channel selection is scanning that channel.

16. The network device of claim 9, wherein, performing the second scan comprises scanning the one or more potentially available channels one at a time until an available channel is located.

* * * * *

UNITED STATES PATENT AND TRADEMARK OFFICE
CERTIFICATE OF CORRECTION

PATENT NO. : 8,542,646 B1
APPLICATION NO. : 13/153242
DATED : September 24, 2013
INVENTOR(S) : Ding It is certified that error appears in the above-identified patent and that said Letters Patent is hereby corrected as shown below:

In the Claims

Claim 9, Column 12, line 53, "canned" should read --scanned--

Signed and Sealed this
Twelfth Day of November, 2013

Teresa Stanek Rea
*Deputy Director of the United States Patent and Trademark Office*